(12) United States Patent
Kirk et al.

(10) Patent No.: US 9,697,424 B2
(45) Date of Patent: Jul. 4, 2017

(54) ACTIVE STEREO WITH SATELLITE DEVICE OR DEVICES

(71) Applicant: Microsoft Corporation, Redmond, WA (US)

(72) Inventors: Adam G. Kirk, Renton, WA (US); Oliver A. Whyte, Seattle, WA (US); Christoph Rhemann, Cambridge (GB); Shahram Izadi, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 283 days.

(21) Appl. No.: 13/924,475

(22) Filed: Jun. 21, 2013

(65) Prior Publication Data
US 2014/0307953 A1 Oct. 16, 2014

Related U.S. Application Data

(60) Provisional application No. 61/812,232, filed on Apr. 15, 2013.

(51) Int. Cl.
*G06K 9/00* (2006.01)
*H04N 5/33* (2006.01)
(Continued)

(52) U.S. Cl.
CPC ...... *G06K 9/00536* (2013.01); *B29C 67/0051* (2013.01); *G01B 11/22* (2013.01);
(Continued)

(58) Field of Classification Search
CPC ....... G01B 11/25–11/254; G01B 11/22; G01B 11/2545; G06K 9/00201–9/00214;
(Continued)

(56) References Cited

U.S. PATENT DOCUMENTS

2002/0136444 A1  9/2002 Brown et al.
2003/0043270 A1* 3/2003 Rafey et al. ............... 348/157
(Continued)

FOREIGN PATENT DOCUMENTS

CN  101061367 A  10/2007
CN  102027434 A  4/2011
(Continued)

OTHER PUBLICATIONS

"International Search Report & Written Opinion Issued in PCT Patent Application No. PCT/US2014/033919", Mailed Date: Jul. 17, 2014, 8 Pages.
(Continued)

*Primary Examiner* — Sean Motsinger

(57) ABSTRACT

The subject disclosure is directed towards communicating image-related data between a base station and/or one or more satellite computing devices, e.g., tablet computers and/or smartphones. A satellite device captures image data and communicates image-related data (such as the images or depth data processed therefrom) to another device, such as a base station. The receiving device uses the image-related data to enhance depth data (e.g., a depth map) based upon the image data captured from the satellite device, which may be physically closer to something in the scene than the base station, for example. To more accurately capture depth data in various conditions, an active illumination pattern may be projected from the base station or another external projector, whereby satellite units may use the other source's active illumination and thereby need not consume internal power to benefit from active illumination.

20 Claims, 8 Drawing Sheets

(51) Int. Cl.

| | | |
|---|---|---|
| *G06K 9/62* | (2006.01) | |
| *H04N 13/02* | (2006.01) | |
| *H04N 13/00* | (2006.01) | |
| *G02B 27/42* | (2006.01) | |
| *B29C 67/00* | (2017.01) | |
| *G06F 12/02* | (2006.01) | |
| *G02B 5/18* | (2006.01) | |
| *G02B 27/44* | (2006.01) | |
| *H04N 5/225* | (2006.01) | |
| *H04N 9/04* | (2006.01) | |
| *H04N 17/00* | (2006.01) | |
| *G01B 11/25* | (2006.01) | |
| *G01B 11/22* | (2006.01) | |
| *G06T 1/60* | (2006.01) | |
| *G06T 7/00* | (2017.01) | |
| *G06T 7/586* | (2017.01) | |
| *A63F 13/213* | (2014.01) | |

(52) U.S. Cl.
CPC .......... *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 12/0207* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/0022* (2013.01); *H04N 13/02* (2013.01); *H04N 13/025* (2013.01); *H04N 13/0239* (2013.01); *H04N 13/0253* (2013.01); *H04N 13/0271* (2013.01); *H04N 17/002* (2013.01); *A63F 13/213* (2014.09); *G06T 2207/30244* (2013.01); *H04N 2013/0081* (2013.01)

(58) Field of Classification Search
CPC .. G06K 9/0063; G06K 9/62; H04N 13/00003; H04N 13/02–13/0296; H04N 5/2256; H04N 5/33; H04N 5/332; H04N 9/045; H04N 13/0022; H04N 17/002; G06T 7/0057; G06T 7/586; G06T 7/00; G06T 1/60; B29C 67/0051; G02B 5/1895; G02B 27/4205; G02B 27/44; G06F 12/0207; A63F 13/213
See application file for complete search history.

(56) References Cited

U.S. PATENT DOCUMENTS

| | | | |
|---|---|---|---|
| 2003/0048459 A1* | 3/2003 | Gooch | 356/620 |
| 2008/0130015 A1 | 6/2008 | Lu | |
| 2008/0218612 A1* | 9/2008 | Border et al. | 348/262 |
| 2009/0080048 A1* | 3/2009 | Tsao | 359/211 |
| 2009/0231425 A1* | 9/2009 | Zalewski | 348/142 |
| 2010/0046004 A1* | 2/2010 | Lee et al. | 356/603 |
| 2010/0177164 A1* | 7/2010 | Zalevsky et al. | 348/46 |
| 2012/0056982 A1* | 3/2012 | Katz et al. | 348/43 |
| 2012/0281087 A1* | 11/2012 | Kruse | 348/136 |
| 2012/0294510 A1* | 11/2012 | Zhang et al. | 382/154 |
| 2013/0215235 A1* | 8/2013 | Russell | 348/47 |
| 2013/0335531 A1* | 12/2013 | Lee et al. | 348/46 |
| 2014/0104387 A1* | 4/2014 | Klusza et al. | 348/46 |
| 2014/0112573 A1* | 4/2014 | Francis et al. | 382/154 |
| 2014/0120319 A1* | 5/2014 | Joseph | 428/172 |
| 2014/0206443 A1* | 7/2014 | Sharp et al. | 463/31 |
| 2014/0225985 A1* | 8/2014 | Klusza et al. | 348/43 |
| 2014/0225988 A1* | 8/2014 | Poropat | 348/46 |
| 2014/0307952 A1* | 10/2014 | Sweeney et al. | 382/154 |
| 2014/0307953 A1* | 10/2014 | Kirk et al. | 382/154 |
| 2014/0354803 A1* | 12/2014 | Chida | 348/136 |

FOREIGN PATENT DOCUMENTS

| | | |
|---|---|---|
| CN | 102385237 A | 3/2012 |
| KR | 1020110132260 A | 12/2011 |

OTHER PUBLICATIONS

"Second Written Opinion Issued in PCT Patent Application No. PCT/US2014/033919", Mailed Date: Mar. 27, 2015, 6 Pages.

"International Preliminary Report on Patentability Issued in PCT Patent Application No. PCT/US2014/033919", Mailed Date: Jul. 13, 2015, 7 Pages.

"First Office Action and Search Report Issued in Chinese Patent Application No. 201480021519.6", Mailed Date: Aug. 30, 2016, 18 Pages.

"Second Office Action and Search Report Issued in Chinese Patent Application No. 201480021519.6", Mailed Date: Mar. 30, 2017, 17 Pages.

\* cited by examiner

ACTIVE STEREO WITH SATELLITE DEVICE OR DEVICES

CROSS-REFERENCE TO RELATED APPLICATION

The present application claims priority to U.S. provisional patent application Ser. No. 61/812,232, filed Apr. 15, 2013.

BACKGROUND

In active depth sensing, such as used by active stereo systems, a projector projects patterns of light such as infrared (IR) dots or lines to illuminate a scene being sensed. Note that the projector may use a laser that consumes on the order of 1 W of power, which means that the projector consumes too much power to be practically built into in a small satellite device such as a smartphone or tablet, and instead is typically part of a device plugged into a wall socket.

The projected patterns are then captured by a camera/sensor (two or more in stereo systems), with the image (or images) processed to compute a depth map or the like. For example, in stereo systems, stereo cameras capture two images from different viewpoints. Then, for example, one way to perform depth estimation with a stereo pair of images is to find correspondences between the images, e.g., to correlate projected and sensed dots in the left image with counterpart dots in the right image. Once matched, the projected patterns within the images may be correlated with one another, and triangulation, possibly along with disparities between one or more features of the correlated dots (e.g., including their intensities) may be used to estimate a depth to an object struck by that particular projected dot.

In most scenarios, the cameras that capture the stereo images are arranged to sense a relatively large space, such as a room, which can be relatively large. As a result, an object in the distance, such as a face, appears in only a relatively small number of camera pixels. Sufficient detail and/or accurate depth estimation is thus not available as needed by many applications, such as face recognition and so forth.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards using information from a satellite (e.g., mobile) device to enhance depth data computed by another device, such as a base station. One or more aspects are directed towards receiving image-related data from a satellite device at another device, and enhancing a first set of depth data based at least in part upon the image-related data and pose information of the satellite device.

In one or more aspects, a base station is configured to determine pose information of a satellite device and capture one or more images. The base station receives image-related data from the satellite device, and compute a depth map based at least in part upon the pose information and the image-related data.

One or more aspects are directed towards receiving image-related data from a satellite device at a base station, and capturing actively illuminated stereo images at the base station. Pose information corresponding to the satellite device is determined. The actively illuminated stereo images are processed to determine a depth map from the base station's perspective that is enhanced by depth information corresponding to the image-related data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using satellite (e.g., mobile) devices such as smartphones and tablet computers to communicate information to and from an active illumination base station, such as to improve depth sensing, provide more image detail and/or estimate pose. At the same time, the satellite devices leverage the base station's active illumination for their own active sensing, whereby the satellite devices do not need to consume battery power to project the light pattern.

In one or more alternatives, multiple satellite devices may use projected light from an external source to communicate image/depth/position data computed therefrom among one another. Depth and other useful data with respect to a scene thus may be available to the devices without the need for a fixed base station.

It should be understood that any of the examples herein are non-limiting. For instance, while satellite devices are generally exemplified herein as being mobile, an auxiliary device (or more than one) may be positioned as a "fixed satellite" which may be calibrated with the base station if desired. This may be used to provide a camera that is closer to some significant part of a scene, for example. Thus, as used herein, the term "satellite" need not be mobile and may include any auxiliary device. As another example, time-of-flight cameras may be used to determine at least some data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in active depth sensing and image capture and processing in general.

Figure 1:
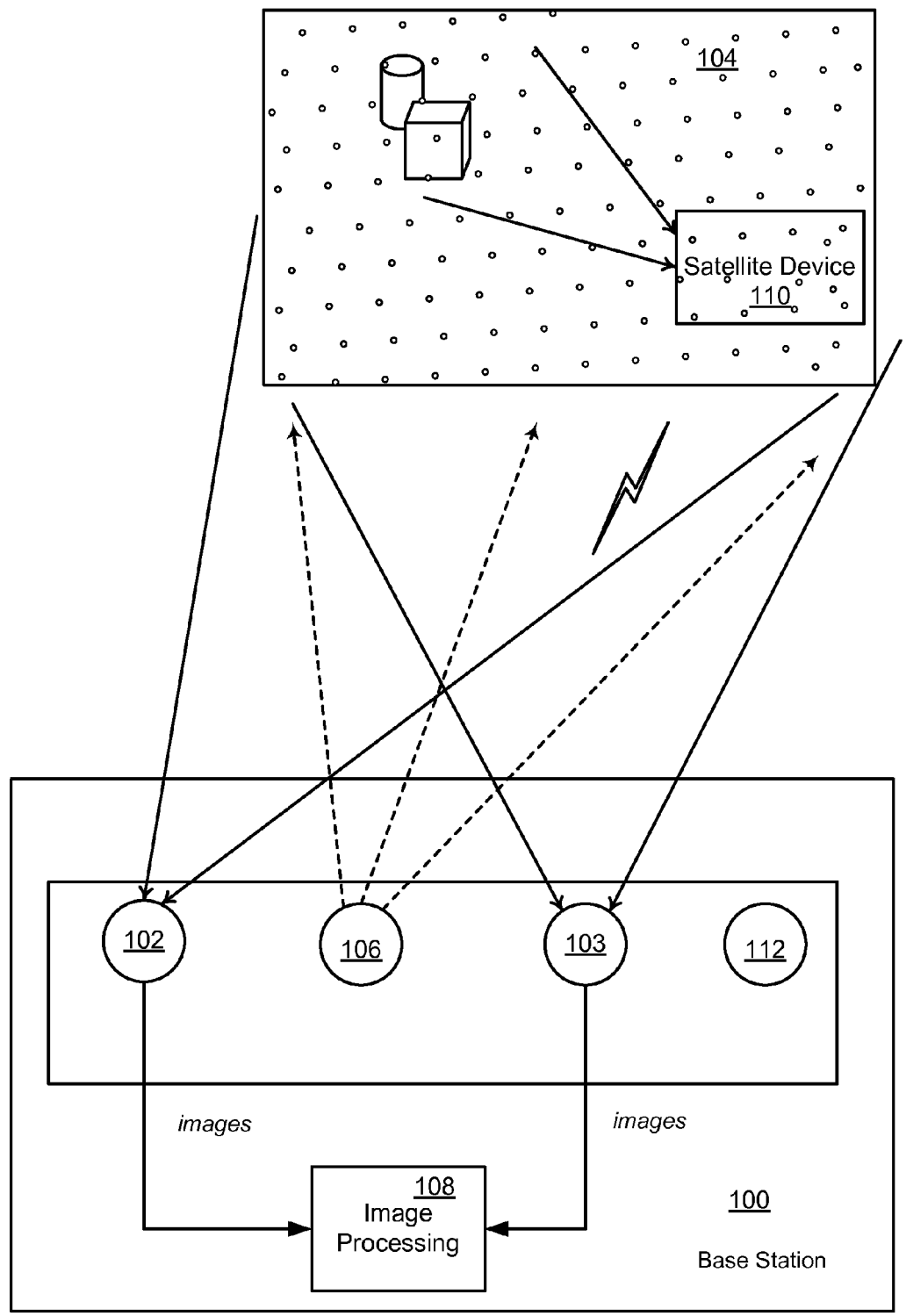
FIG. 1 is a representation of a base station that projects a light pattern into a scene, in which a satellite device captures at least part of the scene, according to one or more example implementations.

FIG. 1 exemplifies one implementation, in which a base station 100 includes stereo (e.g., infrared) cameras 102 and 103 that capture images of a scene 104 from different perspectives. A projector 106 illuminates the scene 104 with a light pattern, (e.g., on the order of 100,000 points). The light pattern may be pseudorandom, and may be generated by emitting laser light through a diffractive optical element. For purposes of brevity, the points/components of the emitted pattern are generally referred to as dots herein, although line patterns, spots of other shapes and so forth instead may be generated and sensed.

The cameras 102 and 103 capture the dots as they reflect off of object surfaces in the scene 104 and (possibly) the background. In general, the dots sensed by one camera (e.g., 102) may be correlated with the dots sensed by the other camera (e.g., 103) via an image processing 108 (e.g., a system or subsystem), thereby providing (e.g., via triangulation) the distance to the reflective surface upon which each dot was incident. Note that FIG. 1 is not intended to be to scale, nor convey any sizes, distance, dot distribution pattern, dot density and so on.

The base station 100 also may include a clean IR camera, e.g., one with a filter that blocks the active illumination pattern and/or an RGB camera that captures visible light; if both are present, they may be combined into a single camera. Camera 112 in FIG. 1 represents any of these alternatives.

As shown in FIG. 1, one of the objects sensed in the scene 104 may be a satellite device 110, such as a mobile smartphone or tablet computing device. At the same time, the satellite device 110 may be sensing other objects in the scene, e.g., including the depth thereto, such as via stereo IR cameras that sense the illumination pattern, as well as possibly clean IR and/or RGB images thereof.

Figure 2:
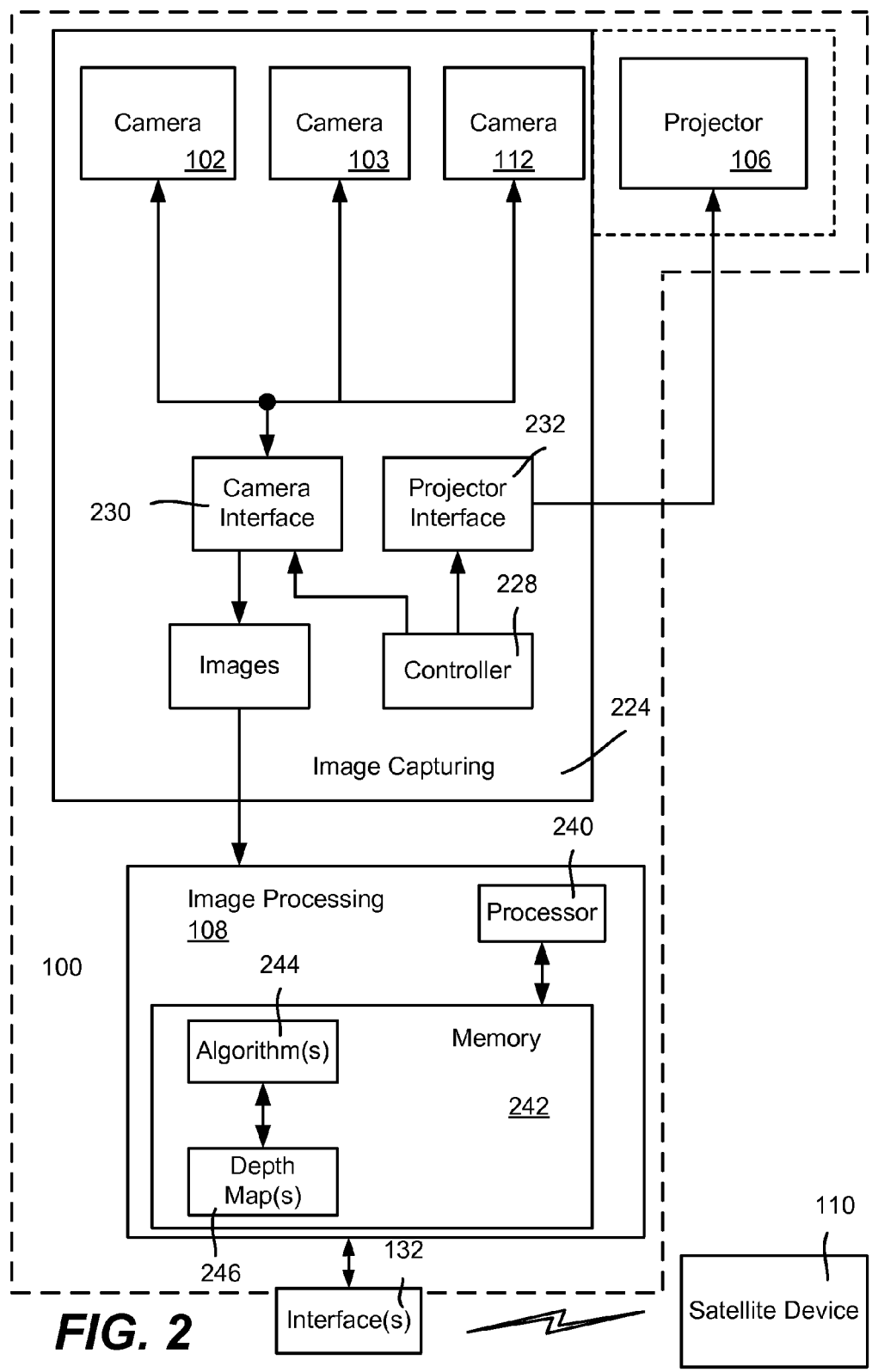
FIG. 2 is a block diagram representing example components that may be used to project and capture images for processing into depth data, according to one or more example implementations.

FIG. 2 shows an example base station 100 in which the stereo cameras 102 and 103 of an image capturing system or subsystem 224 capture images synchronized in time (e.g., the cameras are "genlocked"). In one implementation the cameras capture infrared (IR) images, as IR does not affect the visible appearance of the scene (which is highly advantageous, such as in video conferencing and object modeling applications). As can be readily appreciated, in some scenarios such as studio environments, more than two IR depth-sensing cameras may be present. Further, one or more other cameras may be present in a given system, such as RGB cameras, and such other cameras may be used to help align images, correlate dot pairs in different stereo images, and so forth, for example.

In FIG. 2, the projector 106 projects an IR pattern onto a scene. By illuminating the scene with a relatively large number of distributed infrared dots, the cameras 102 and 103 capture more texture data as part of the infrared image data. Note that the placement of the projector 106 may be outside the cameras (e.g., FIG. 1), or in between the cameras (FIG. 2) or at another location, such as above or below one or both of the cameras. The examples herein are in no way limiting of where the cameras 102, 103 and/or projector 106 are located relative to one another, and similarly, the cameras may be positioned at different positions relative to each other.

In one implementation the example image capturing system or subsystem 224 includes a controller 228 that via a camera interface 230 controls the operation of the cameras 102 and 103, and if present, the camera 112. The exemplified controller via a projector interface 232 also controls the operation of the projector 106. For example, the cameras 102 and 103 are synchronized (genlocked) to capture stereo images at the same time, such as by a controller signal (or different signals for each camera). The projector 106 may be turned on or off, pulsed, and otherwise have one or more parameters controllably varied, for example.

The images captured by the cameras 102 and 103 (and camera 112, if present) are provided to the image processing 108 system or subsystem, comprising logic implemented in hardware and/or software (e.g., as computer-readable instructions). In some implementations, the image processing system 108 and image capturing system or subsystem 224, or parts thereof, may be combined into a single device. For example a home entertainment device may include all of the components shown in FIG. 1 (as well as others not shown). In other implementations, parts (or all) of the image capturing system or subsystem 224, such as the cameras and projector, may be a separate device that couples to a gaming console, personal computer, satellite device, dedicated processing device and/or the like.

In one or more implementations, the image processing system or subsystem 108 includes a processor 240 and a memory 242 containing one or more image processing algorithms 244. One or more depth maps may 246 be obtained via the algorithms 244 such as by extracting matching features (such as dots and/or lines). For example, as is known, such as described in U.S. published patent application no. 20130100256, hereby incorporated by reference, different dots or other projected elements have different features when captured, including intensity (brightness), depending on the distance from the projector to the reflective surfaces and/or the distance from the camera to the reflective surfaces. As is also known, the dots in different images taken at the same time (e.g., with genlocked stereo cameras) may be correlated with one another, such as by matching small (e.g., RGB) patches between RGB images of the same scene captured at the same instant. Thus, with captured images, known algorithms can determine individual depth-related features (depth maps) by matching projected light components (e.g., dots) in each image, using triangulation/disparities of certain features between matched dots to determine depths. This is one way in which a depth map may be obtained via stereo image processing.

Also shown in FIG. 1 are one or more interfaces 132 to the base station, such as for connecting a keyboard, game controller, display, pointing device microphone for speech commands and/or the like as appropriate for a user to interact with an application or the like that uses the depth map. At least one interface 132 allows the satellite device 110 to communicate (e.g., wirelessly) with the based station as described herein.

One or more implementations comprise a base station 100 in a room emitting the laser pattern to calculate depth. When the user uses a satellite device 110, such as a smartphone or tablet, the camera or stereo cameras on the satellite device 110 can observe the base unit's emitted laser pattern. The satellite device 110 thus can compute stereo based on that externally-generated laser pattern, as well as communicate information to the base station 100.

As described herein, the satellite device's data may be used to compute a depth map at higher resolution than the base station can compute; (note that "higher resolution" as used herein is not referring to any of the cameras' resolutions, but rather to the ability to capture an object with more pixels than a more distant camera at the base station because the satellite device is closer to the object, e.g., the user's face). Moreover, not only may the spatial resolution be increased, but also the depth resolution/precision. The image information or data corresponding to the information (e.g., a depth map computed at the satellite device) may be transmitted to the base unit. As used herein, "image-related data" refers to actual image data (of one or more IR and/or RGB actively illuminated images and/or clean IR and/or RGB images, in whole or in part,) any associated metadata, and/or any corresponding information processed from that image data, e.g., a depth map. Thus, image-related data may be communicated to and from a base station, and to and from satellite devices.

Additionally, the images and/or depth maps taken at the satellite device and at the base unit can be correlated. This provides for six degrees of freedom (6DoF) pose estimation of the mobile unit's location relative to the base unit.

Pose estimation may be determined by image alignment and/or by pattern matching/dot correlation. By way of example, if the satellite device captures an image that the base station can also sense (e.g., user or device is not blocking the base station from "seeing" the same area), then the pixels (or corresponding surrounding patches of each pixel) can be matched in known ways. Alignment also may be established by aligning the depth data computed from the base station with the depth data computed from the satellite device. The pose of the satellite device thus may be estimated.

Figure 3:
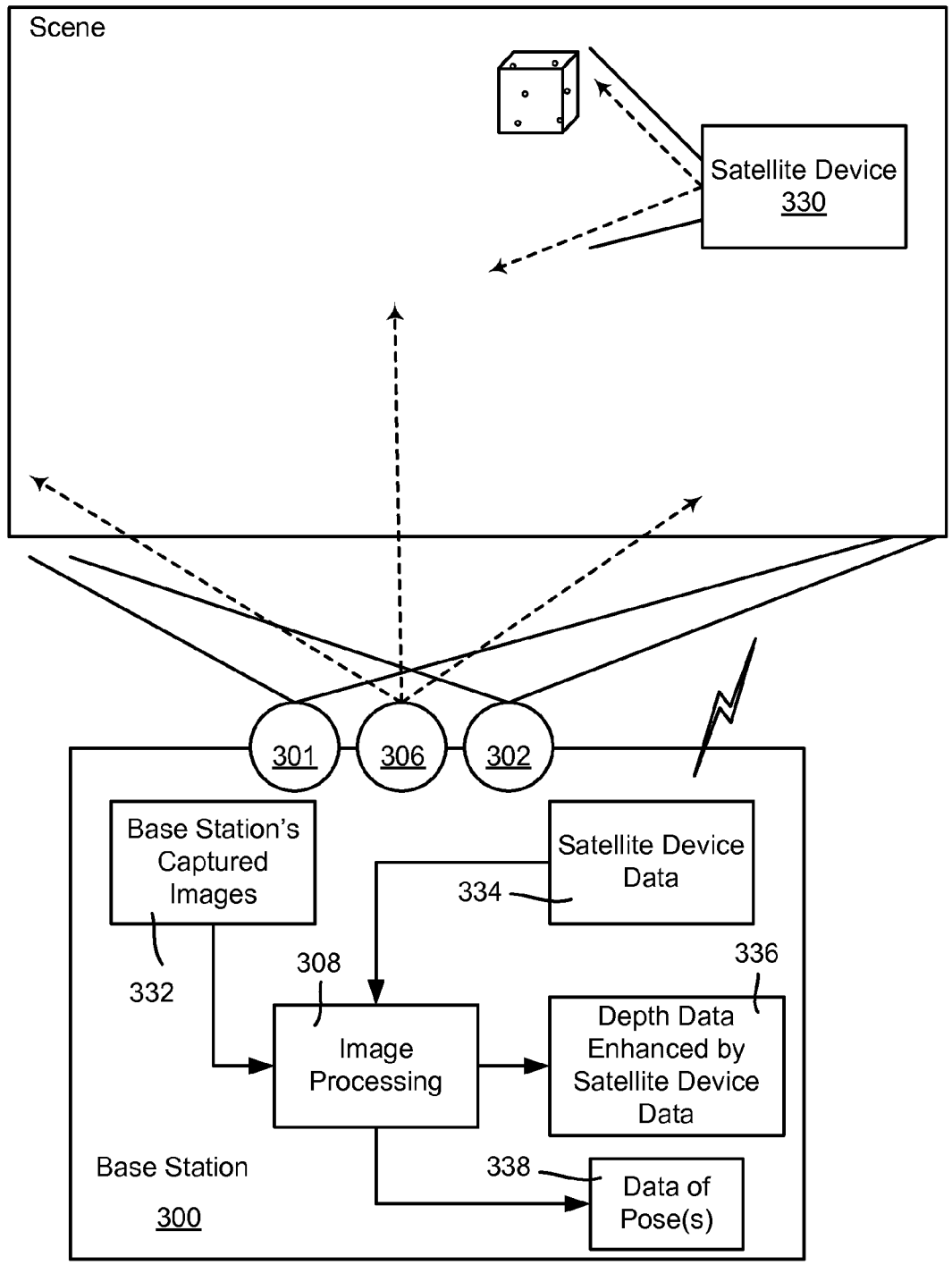
FIG. 3 is a block diagram representing example processing of base station data and satellite data into depth data, according to one or more example implementations.

This is generally represented in FIG. 3, where a base station 300 projects a light pattern from a projector 306 that is sensed by base station cameras 301 and 302 as well as by one or more cameras on a satellite device 330 (more than one satellite device may be present). The cameras 301 and 302 provide base station images 332 that are fed into image processing along with satellite device data 334, which may be images or information such as depth maps locally processed from the images on each satellite device.

Note that as indicated via the dashed lines from the device 330, an optional (e.g., low power) projector may be included in any or all of the one or more satellite devices. The data projected by the satellite device augments the data projected from the base station. The projector in the satellite device 330 may be lower-power because it is limited in distance, limited spatially (e.g. a very sparse pattern or only focused at a small image region, and/or limited temporally (e.g., emitted only every few frames).

The base station images 332 may be processed to determine the pose/3D location of the satellite device 330. With this information, image processing 308 outputs depth data 336, which may be conventional depth data from the base station's own cameras enhanced by the satellite device data 334. In general, the projected dots captured by the base station cameras may correlated with dots captured by the satellite device, after adjusting for size differences and the like due to the resolution differences. The pose data 338 also may be output, such as to other satellite devices.

Note that instead of the satellite device providing the base station with data for enhancing its image data, the base station may send an approximate depth map (along with the device's pose) to the satellite device. This may be used to increase the accuracy, and/or decrease the required computation for the satellite device's own depth estimation.

The base station's depth map (as well as RGB data) may be enhanced by downsampling the higher resolution data into a partial depth map that is combined with the initial base station depth map at the appropriate coordinates, after adjusting the depths for the pose, to improve accuracy at those coordinates, for example. Another way that the base station's depth map may be enhanced is to maintain the original depth map in association with the higher resolution depth map (e.g., after adjusting depths based upon pose), for example. In this way, an application using the depth map may "zoom-in" to the more fine-grained depth data when desired, e.g., the application need not be limited to the original depth map's pixel resolution.

Note that some mobile devices may have front and rear facing cameras. If so, one scenario is to use the cameras for different purposes. For example, the rear facing camera may be used to capture images for pose computations, while the front facing camera may capture images of the user's face, for example, which may be used for enhanced depth computations.

Figure 4:
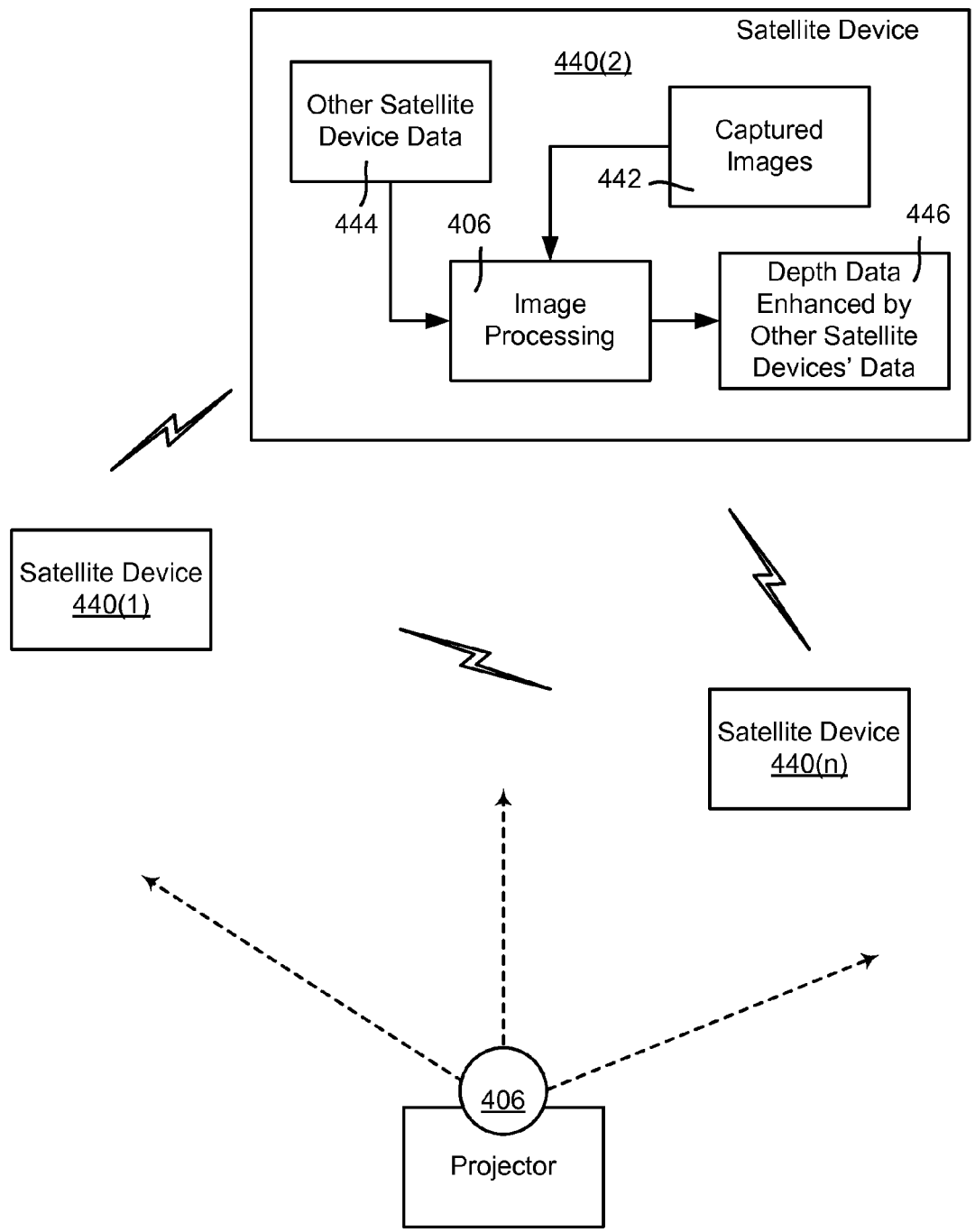
FIG. 4 is a block diagram representing example processing of one satellite device's data and another satellite device's data into depth data, according to one or more example implementations.

FIG. 4 shows another alternative, in which a plurality of satellite devices 440(1)-440(n) act as peers and thus can compute depth information for a scene without a base station. However, because satellite devices are battery powered, a light pattern from an external projector 406 (or more than one) may be leveraged. Note that a base station is basically just another device, except generally not mobile (a base station device may be relatively compact and portable but uses a large or fixed power source, and thus is not typically carried around, unlike a tablet device or smartphone).

As shown in FIG. 4, each of the satellite devices 440(1)-440(n) exchanges its data with one another. One of the devices 440(2) is shown as having image processing 406 that processes its own image data 442 and other satellite device data 444 to obtain depth data 446 enhanced by one or more other satellite devices' data; it is understood that any satellite device may have similar image processing capabilities, and/or may receive depth data from another satellite device.

Figure 5:
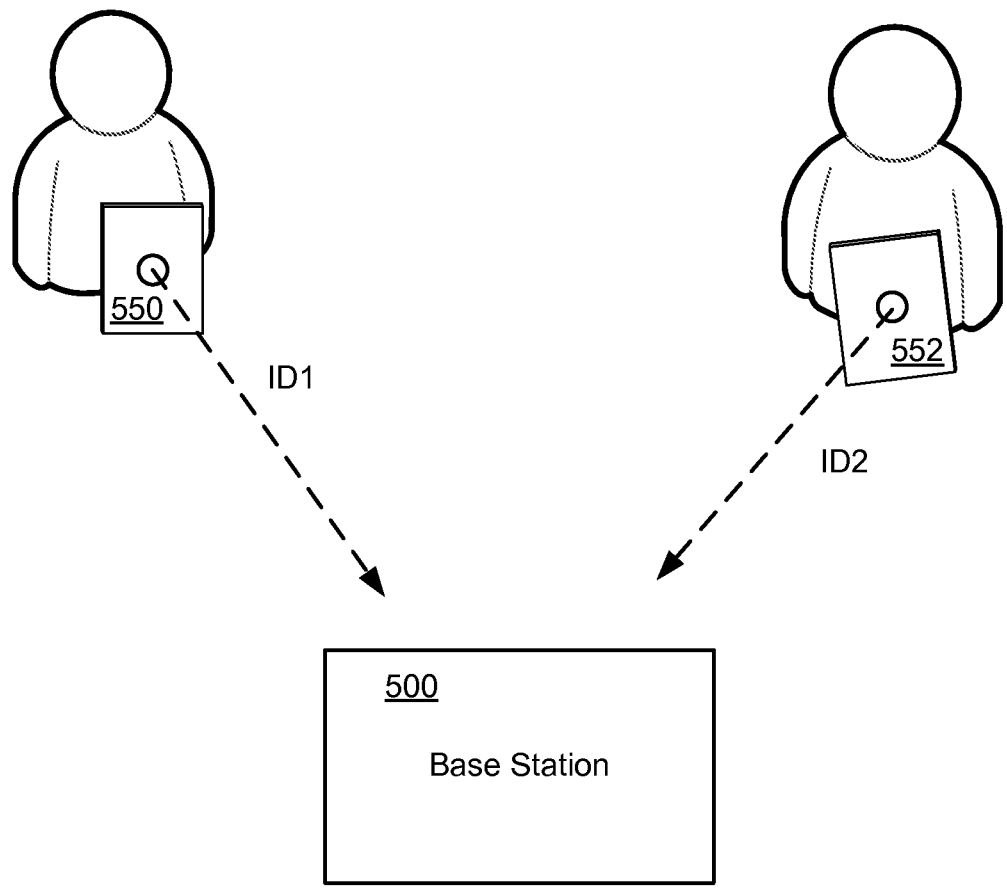
FIG. 5 is a representation of satellite device configured to signal a base station, according to one or more example implementations.

In another aspect, FIG. 5 shows satellite devices 550 and 552 configured to provide a signal such as to flash an identifier to a base station 500 via infrared light. The identifier may include or be used to look up any type of information, including device type, capabilities and so forth. The signal also may help in more efficiently determining satellite device pose.

Note that instead of the base station identifying a satellite device, and/or estimating its pose, satellite devices may identify the base station, and estimate its own pose based on that information. This allows a satellite device to determine its pose without necessarily communicating with the base station, which may be useful in some situations (e.g. if there is a relatively large number of satellite devices).

Figure 6A:
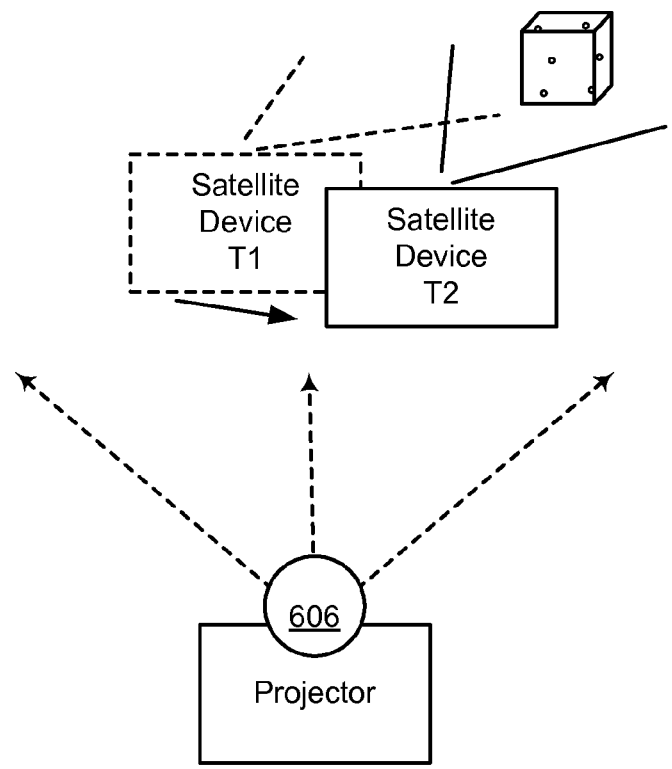
FIGS. 6A and 6B are representations of ways in which depth data may be determined from a single satellite device camera, according to one or more example implementations.

In another aspect, FIG. 6A shows how a satellite device moving over time can compute depth data with a single camera. Because the dots are stationary, any movement of the device changes the dots' positions from previous to the new perspective of the camera.

Figure 6B:
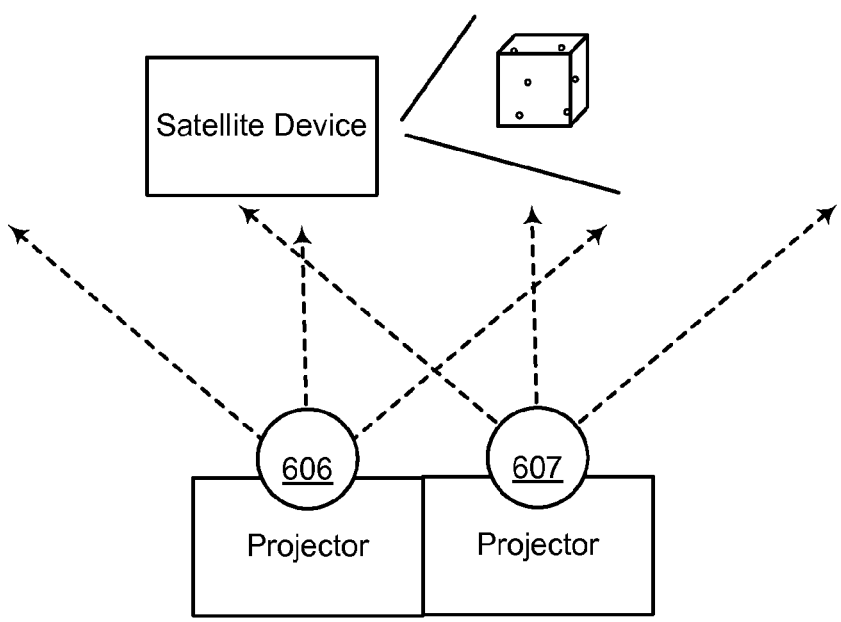

FIG. 6B shows two projectors 606 and 607 sensed by one camera on a satellite mobile device. The projected patterns may be different, whereby the satellite device may distinguish one source from another, or the projectors can alternate which one is projecting at a time to provide two different perspectives of the same object/scene being sensed.

Indeed, a projector may have knowledge of the light pattern, and if so is basically a camera in reverse. Thus a single projector and single satellite device camera may be used to compute stereo depth data.

Figure 7:
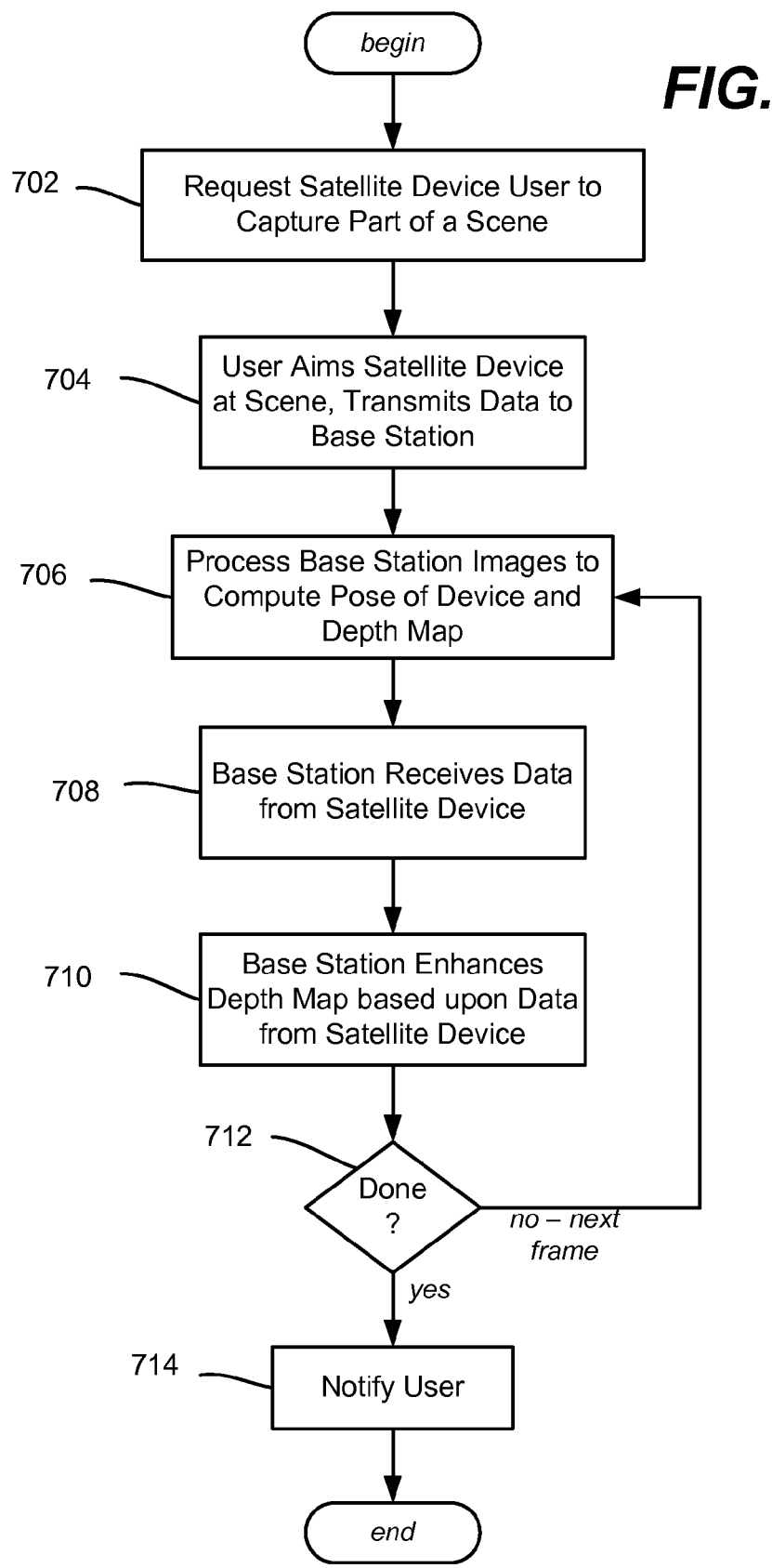
FIG. 7 is a flow diagram representing example steps in obtaining image-related data from a satellite device for use in determining a depth map, according to one or more example implementations.

FIG. 7 is a simplified flow diagram representing an example set of steps that may be taken to obtain enhanced depth information (and possibly other information such as RGB images) via a satellite device. For example, consider that an application program running on or coupled to a base station wants to produce a detailed close-up representation of an object that is relatively far from the base station and not particularly easy or desirable to move closer. Although a base station is described in the example steps below, it is understood that another mobile device or set of devices may be used instead of a base station.

At step 702, a base station program (or a program coupled thereto) communicates a message to a user instructing the user to aim a satellite device at the object to obtain some close-up video frames. At step 704, the user does so, whereby the satellite device starts transmitting data (e.g., a stream of images or depth data processed therefrom) to the base station. At each frame, at step 706 the base station processes its own captured images to determine the satellite camera pose, and compute an initial depth map.

Step 708 represents receiving data from the satellite device; note that at least some of these steps may be occurring in parallel and/or in different orders, e.g., some or all of the data may be received from the satellite device before, during or after base station processing. Further note that instead of per frame, some slower sampling rate may be used depending on the application.

Step 710 represents using the satellite data to enhance the depth map with more accurate depth data, for example, and/or to maintain a separate depth map for the captured object. Step 712 repeats the process until done, at which time the user is notified.

The user may be asked to capture video of the object from different directions. If projected light is being sensed by the satellite device, the user may be instructed to turn the object so that different parts of the object face the projector at different times (note that the user cannot see the infrared light pattern, and thus may not know it is being projected, whereby the instruction may be to rotate the object to face the base station device). Alternatively multiple projectors from different directions may be present. In this way, a full three-dimensional mesh or the like of the object may be generated (with which RGB image data may be combined), at a significantly greater level of detail than the base station is able to capture.

The satellite device and base station (or other mobile device) may operate together without human intervention. For example, a mobile device application may detect something interesting via the device camera and communicate image data to the base station. Periodically or on some other schedule the base station may request one or more images from a satellite device. The base station (e.g., as instructed by an application program) may want to have an improved image of something that (as known via pose data) that the satellite device's camera is aiming at. For example, this may be to obtain a higher resolution image whenever desired.

As another example, data from the satellite device may be used to replace data in the image map captured by a satellite device or devices. As a particular example, consider that something is blocking a desired part of a scene from the base station's perspective, e.g., a person has walked in front of an interesting part of a scene that the satellite device seeks to capture. Via a satellite device or set of satellite devices, the scene may be captured (from a different angle and possibly different resolution), whereby the scene depths (and RGB or clean IR data) can be recomputed as if the person was not blocking that part of the scene.

Example Operating Environment

Figure 8:
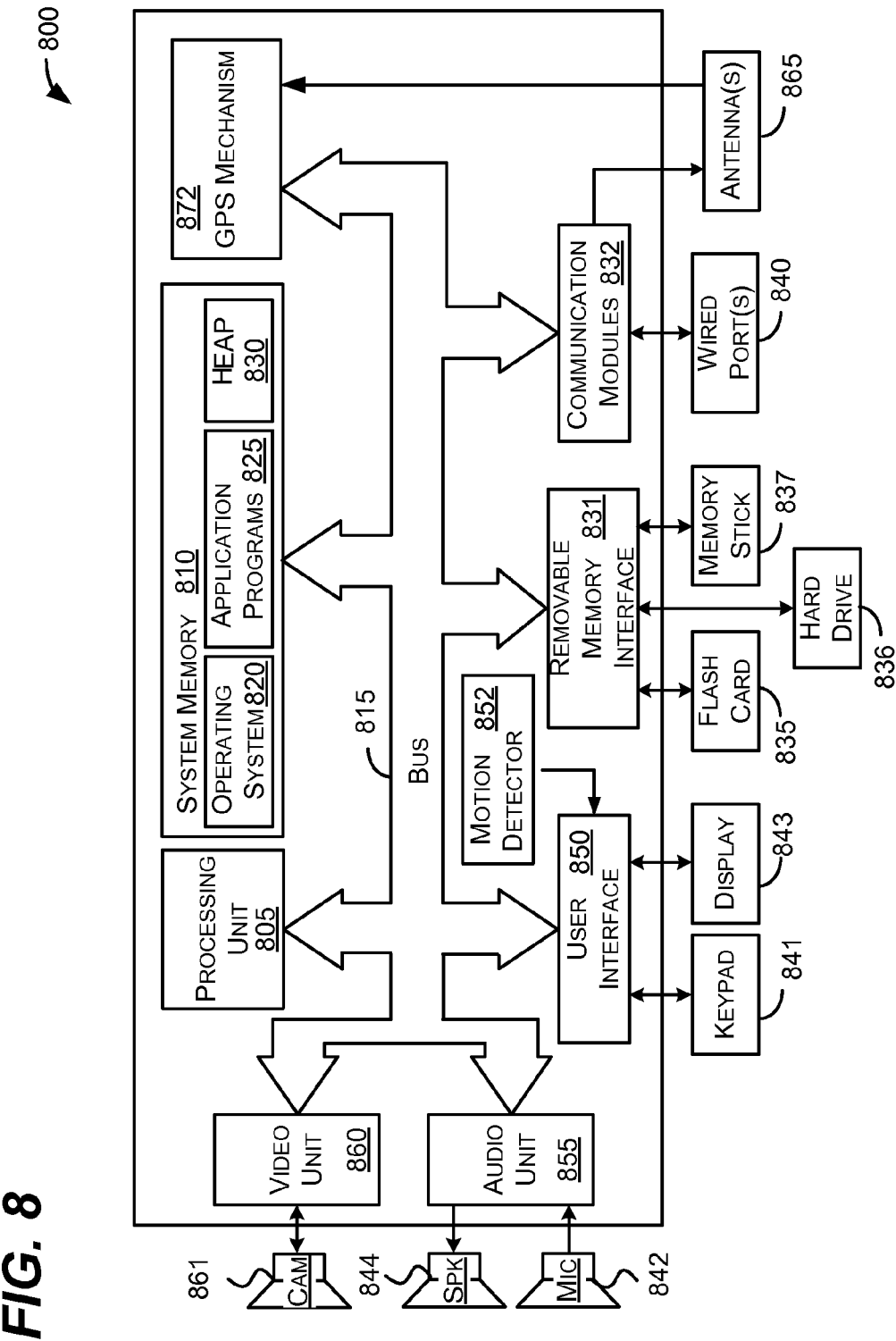
FIG. 8 is a block diagram representing an exemplary non-limiting computing system or operating environment, in the form of a mobile device, into which one or more aspects of various embodiments described herein can be implemented.

FIG. 8 illustrates an example of a suitable mobile device 800 on which aspects of the subject matter described herein may be implemented. The mobile device 800 is only one example of a device and is not intended to suggest any limitation as to the scope of use or functionality of aspects of the subject matter described herein. Neither should the mobile device 800 be interpreted as having any dependency or requirement relating to any one or combination of components illustrated in the example mobile device 800.

With reference to FIG. 8, an example device for implementing aspects of the subject matter described herein includes a mobile device 800. In some embodiments, the mobile device 800 comprises a cell phone, a handheld device that allows voice communications with others, some other voice communications device, or the like. In these embodiments, the mobile device 800 may be equipped with a camera for taking pictures, although this may not be required in other embodiments. In other embodiments, the mobile device 800 may comprise a personal digital assistant (PDA), hand-held gaming device, notebook computer, printer, appliance including a set-top, media center, or other appliance, other mobile devices, or the like. In yet other embodiments, the mobile device 800 may comprise devices that are generally considered non-mobile such as personal computers, servers, or the like.

The mobile device may comprise a hand-held remote control of an appliance or toy, with additional circuitry to provide the control logic along with a way to input data to the remote control. For example, an input jack or other data receiving sensor may allow the device to be repurposed for non-control code data transmission. This may be accomplished without needing to store much of the data to transmit, e.g., the device may act as a data relay for another device (possibly with some buffering), such as a smartphone.

Components of the mobile device 800 may include, but are not limited to, a processing unit 805, system memory 810, and a bus 815 that couples various system components including the system memory 810 to the processing unit 805. The bus 815 may include any of several types of bus structures including a memory bus, memory controller, a peripheral bus, and a local bus using any of a variety of bus architectures, and the like. The bus 815 allows data to be transmitted between various components of the mobile device 800.

The mobile device 800 may include a variety of computer-readable media. Computer-readable media can be any available media that can be accessed by the mobile device 800 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 800.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 810 includes computer storage media in the form of volatile and/or nonvolatile memory and may include read only memory (ROM) and random access memory (RAM). On a mobile device such as a cell phone, operating system code 820 is sometimes included in ROM although, in other embodiments, this is not required. Similarly, application programs 825 are often placed in RAM although again, in other embodiments, application programs may be placed in ROM or in other computer-readable memory. The heap 830 provides memory for state associated with the operating system 820 and the application programs 825. For example, the operating system 820 and application programs 825 may store variables and data structures in the heap 830 during their operations.

The mobile device 800 may also include other removable/non-removable, volatile/nonvolatile memory. By way of example, FIG. 8 illustrates a flash card 835, a hard disk drive 836, and a memory stick 837. The hard disk drive 836 may be miniaturized to fit in a memory slot, for example. The mobile device 800 may interface with these types of non-volatile removable memory via a removable memory interface 831, or may be connected via a universal serial bus (USB), IEEE 8394, one or more of the wired port(s) 840, or antenna(s) 865. In these embodiments, the removable memory devices 835-437 may interface with the mobile device via the communications module(s) 832. In some embodiments, not all of these types of memory may be included on a single mobile device. In other embodiments, one or more of these and other types of removable memory may be included on a single mobile device.

In some embodiments, the hard disk drive 836 may be connected in such a way as to be more permanently attached to the mobile device 800. For example, the hard disk drive 836 may be connected to an interface such as parallel advanced technology attachment (PATA), serial advanced technology attachment (SATA) or otherwise, which may be connected to the bus 815. In such embodiments, removing the hard drive may involve removing a cover of the mobile device 800 and removing screws or other fasteners that connect the hard drive 836 to support structures within the mobile device 800.

The removable memory devices 835-437 and their associated computer storage media, discussed above and illustrated in FIG. 8, provide storage of computer-readable instructions, program modules, data structures, and other data for the mobile device 800. For example, the removable memory device or devices 835-437 may store images taken by the mobile device 800, voice recordings, contact information, programs, data for the programs and so forth.

A user may enter commands and information into the mobile device 800 through input devices such as a key pad 841 and the microphone 842. In some embodiments, the display 843 may be touch-sensitive screen and may allow a user to enter commands and information thereon. The key pad 841 and display 843 may be connected to the processing unit 805 through a user input interface 850 that is coupled to the bus 815, but may also be connected by other interface and bus structures, such as the communications module(s) 832 and wired port(s) 840. Motion detection 852 can be used to determine gestures made with the device 800.

A user may communicate with other users via speaking into the microphone 842 and via text messages that are entered on the key pad 841 or a touch sensitive display 843, for example. The audio unit 855 may provide electrical signals to drive the speaker 844 as well as receive and digitize audio signals received from the microphone 842.

The mobile device 800 may include a video unit 860 that provides signals to drive a camera 861. The video unit 860 may also receive images obtained by the camera 861 and provide these images to the processing unit 805 and/or memory included on the mobile device 800. The images obtained by the camera 861 may comprise video, one or more images that do not form a video, or some combination thereof.

The communication module(s) 832 may provide signals to and receive signals from one or more antenna(s) 865. One of the antenna(s) 865 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 872. In turn, the GPS mechanism 872 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 800 may connect to one or more remote devices. The remote devices may include a personal computer, a server, a router, a network PC, a cell phone, a media playback device, a peer device or other common network node, and typically includes many or all of the elements described above relative to the mobile device 800.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   receiving image-related data from a first image capture device on a satellite device, the image-related data comprising a scene illuminated by a projected light pattern;
   receiving at least one pose image from a second image capture device on the satellite device;
   receiving an image captured by a base station, the image comprising at least a portion of the illuminated scene;
   computing a depth map based at least in part upon pose information of the satellite device and the image-related data; and
   one or more of the following:
   receiving the pose information of the satellite device using the at least one pose information, the pose information being determined by the satellite device; or
   receiving the at least one pose image from the satellite device; and
   determining the pose information of the satellite device using the at least one pose image.

2. The method of claim 1 further comprising enhancing a set of depth data associated with the image based at least in part upon the image-related data and the pose information.

3. The method of claim 1 wherein the satellite device is a mobile device.

4. The method of claim 2 wherein enhancing the set of depth data comprises replacing at least some of depth data in the set of depth data with other depth data corresponding to at least part of the image-related data.

5. The method of claim 2 wherein enhancing the set of depth data comprises maintaining a first depth map corresponding to the set of depth data in association with a second depth map corresponding to the image-related data.

6. The method of claim 1 wherein the method further comprises receiving a signal from the satellite device, and using the signal in determining the pose information.

7. The method of claim 1 wherein the method further comprises sending a request to the satellite device to provide the image-related data.

8. The method of claim 7 wherein the method further comprises determining when to send the request based at least in part upon the pose information of the satellite device.

9. The method of claim 1 wherein the method further comprises receiving at least one image captured at the satellite device, the at least one image being actively illuminated by a light pattern from a projector decoupled from the satellite device and the base station.

10. The method of claim 1 wherein the method further comprises receiving at least some depth data computed at the satellite device based upon at least one image captured thereby, the at least some depth data being at least part of the image-related data.

11. The method of claim 10 wherein the at least some depth data is computed by processing one or more actively illuminated images captured by the satellite device.

12. The method of claim 10 wherein the at least some depth data is computed by processing one or more actively illuminated stereo images captured by the satellite device and at least some active illumination emitted from the satellite device.

13. The method of claim 2 further comprising outputting at least one depth map corresponding to the enhanced set of depth data based at least in part upon the image-related data and the pose information.

14. A system comprising:
   a projector for projecting a light pattern towards a scene to create an illuminated scene;
   a satellite device comprising a first image capture device for capturing image-related data of the illuminated scene and a second image capture device for capturing at least one pose image;
   a base station for capturing one or more images of the illuminated scene; and
   a processor configured to:
   receive the one or more images of the illuminated scene;
   receive the image-related data from the satellite device;
   compute a depth map based at least in part upon pose information of the satellite device and the image-related data; and
   one of the following:
   receive the pose information of the satellite device using the at least one pose information, the pose information being determined by the satellite device; or
   receive the at least one pose image from the satellite device; and
   determine the pose information of the satellite device using the at least one pose image.

15. The system of claim 14, wherein the one or more images captured by the base station comprises actively illuminated image data, the depth map being computed based at least in part upon the pose information of the satellite device, the image-related data, and the actively illuminated image data.

16. The system of claim 14 wherein the processor is further configured to determine the pose information of the satellite device from the one or more images of the illuminated scene.

17. The system of claim 14 wherein the satellite device is configured to compute depth data and communicate the depth data to the base station as at least part of the image-related data.

18. One or more computer-readable storage devices having computer-executable instructions, the computer-executable instructions causing a processor to perform operations comprising:
receiving image-related data of an illuminated scene from a first image capture device on a satellite device, the image-related data comprising a scene illuminated by a projected light pattern;
receiving at least one pose image from a second image capture device on the satellite device;
receiving an image captured by a base station, the image comprising at least a portion of the illuminated scene;
computing a depth map based at least in part upon pose information of the satellite device and the image-related data; and
one or more of the following:
receiving the pose information of the satellite device using the at least one pose information, the pose information being determined by the satellite device; or
receiving the at least one pose image from the satellite device; and
determining the pose information of the satellite device using the at least one pose image.

19. The method of claim 1 further comprising
determining, using the satellite device, the pose information of the satellite device using the at least one pose image.

20. The method of claim 1
wherein the base station determines the pose information of the satellite device.

* * * * *